United States Patent [19]
Reno

[11] 3,795,295
[45] Mar. 5, 1974

[54] DEVICE FOR PREDETERMINING INITIAL FREE PLAY IN CLUTCH ACTUATING MECHANISMS

[75] Inventor: Frederick Reno, Detroit, Mich.

[73] Assignee: Ford Motor Company, Dearborn, Mich.

[22] Filed: Dec. 6, 1972

[21] Appl. No.: 312,446

[52] U.S. Cl............... 192/110 R, 192/99 S, 74/512
[51] Int. Cl.......................... F16d 21/04, G05g 1/14
[58] Field of Search............192/70.26, 89, 98, 99 S, 192/110 R, 111 R; 75/512; 85/72

[56] References Cited
UNITED STATES PATENTS
3,587,802  6/1971  Pink................................. 192/89 R
3,730,318  5/1973  Camp............................... 192/99 S Primary Examiner—Benjamin W. Wyche
Assistant Examiner—Lance W. Chandler
Attorney, Agent, or Firm—Keith L. Zerschling; Clifford L. Sadler

[57] ABSTRACT

This disclosure relates to clutches for motor vehicles, and more particularly to a clutch actuating system having means for establishing initial free play without using external gauges. A clutch in accordance with this invention may have a clutch pedal, a clutch release lever and a Bowden wire interconnecting the pedal and the lever. The tubular housing or sheath portion of the Bowden wire has one of its ends secured by a pair of jam nuts to the vehicle body adjacent to the clutch pedal. The other end of the sheath is secured to a stationary member adjacent the clutch release lever by a jan nut and a unique frangible jam nut. The frangible nut has a threaded nut portion and a frangible collar that extends axially from the threaded portion. During initial installation of the clutch actuating mechanism, the jam nuts are tightened to remove all slack in the system and to bring the release fingers of the pressure plate assembly into firm contact with the clutch release bearing. The jam nut that is paired with the frangible nut is tightened until pressure on the collar causes it to fracture and separate from the threaded portion. The gap between the two nuts left by the separated collar is closed by additional tightening of the regular nut. The collar of the special jam nut is dimensioned so that upon its fracture and tightening of the nut paired with it, a proper predetermined amount of initial free play is established in the system.

8 Claims, 4 Drawing Figures

PATENTED MAR 5 1974 3,795,295
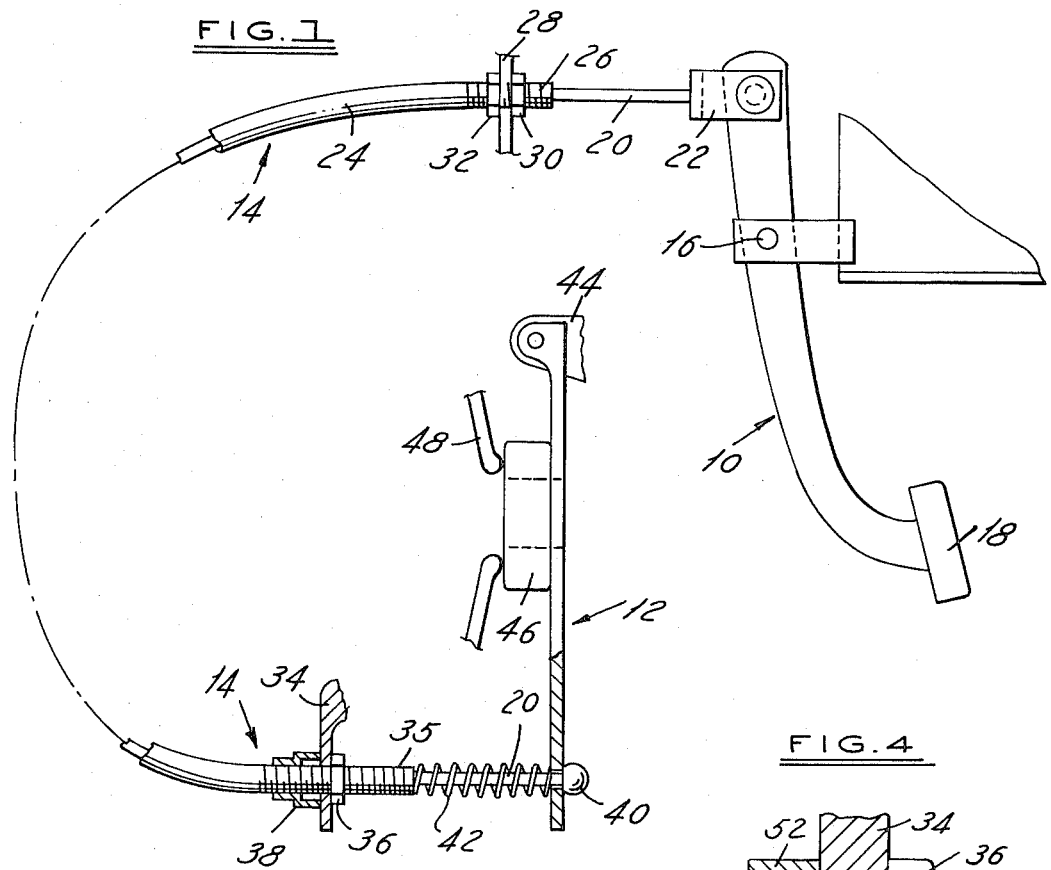
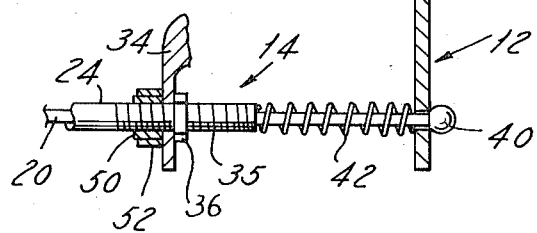
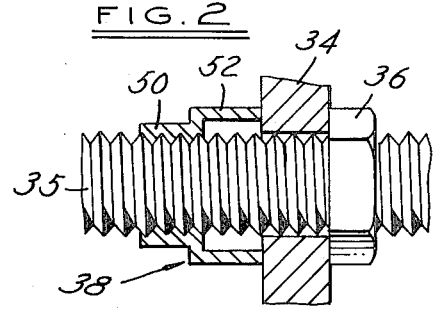

DEVICE FOR PREDETERMINING INITIAL FREE PLAY IN CLUTCH ACTUATING MECHANISMS

BACKGROUND OF THE DISCLOSURE

The present invention relates to a Bowden wire type clutch actuating mechanism for a motor vehicle, and more particularly to a clutch actuating mechanism that is constructed to automatically establish an appropriate amount of initial free play without using external gauges.

In conventional clutch actuating systems employing Bowden wire actuators, it is common practice to establish free play by pulling the Bowden wire assembly until the clutch release bearing is in firm contact with the clutch release fingers of the pressure plate assembly. The jam nuts securing one end of the Bowden wire sheath are then backed off a desired amount and locked in position. The amount that the jam nuts are backed off determines the initial free play. In order to provide the proper level of free play, a gauge must be used to measure the distance which the nuts are backed off.

It is the principal ojbect of the present invention to provide a clutch actuating system of the Bowden wire type which automatically establishes the amount of initial free play without the use of external gauges.

BRIEF SUMMARY OF THE DISCLOSURE

In accordance with the presently preferred embodiment of this invention, a clutch actuating system is provided that permits initial clutch free play to be automatically established upon installation of the system without the use of external gauges.

In the preferred embodiment, a clutch pedal is connected to a clutch release lever by a Bowden wire assembly. The sheath portion of the Bowden wire has one end secured by a first pair of jam nuts to the vehicle body adjacent to the pedal. The other end of the Bowden sheath is connected to a chassis flange, such as flange connected to the flywheel housing, by a second pair of jam nuts. One of the jam nuts of the second pair is of special construction.

The special jam nut has a threaded portion and a frangible annular extension or collar. The threaded portion engages a threaded fitting on the end of the Bowden wire sheath. The special nut is of thin wall construction where the annular collar portion joins the threaded portion whereby when an axial force is applied to it that exceeds a predetermined minimum value, the annular collar will fracture and will separate from the threaded portion.

The Bowden wire is installed by connecting the flexible cable to the clutch pedal and to the clutch release lever. The first pair of jam nuts are used to secure one end of the sheath to the body adjacent to the clutch pedal. The second pair of jam nuts (including the special jam nut) connecting the other end of the sheath to the chassis flange are tightened to remove all slack in the system and to bring the release bearing into firm contact with the clutch release fingers. After the free play is removed, the regular jam nut of the second pair of nuts is tightened with a tool, thereby exerting a load on the annular collar or extension and causing it to fracture. After the annular collar has separated from the threaded portion, the regular nut of the second pair is tightened in a conventional manner to secure the sheath end to the flange of the flywheel housing.

The length of the frangible annular extension of the special jam nut automatically determines the amount of free play that will be established. By merely removing the slack in the system and then tightening a regular jam nut, appropriate free play is provided in the clutch actuating system without the use of external gauges.

BRIEF DESCRIPTION OF THE DRAWINGS

The many objects and advantages of a clutch actuating system constructed in accordance with this invention will become apparent upon consideration of the following detailed description and the accompanying drawings, in which:

FIG. 1 is a schematic view of a clutch actuating system embodying the present invention;

FIG. 2 is an enlarged elevational view, partly in section, of the special jam nut and the regular jam nut connecting one end of the Bowden wire sheath to a flange secured to the flywheel housing;

FIG. 3 is a view of a portion of the clutch actuating system after the free play adjustment has been made; and FIG. 4 is an enlarged elevational view, partly in section, of the portion of FIG. 3 showing the attachment between the Bowden sheath and the flywheel housing flange.

DETAILED DESCRIPTION OF THE PREFERRED EMBODIMENT

Referring now to the drawings, wherein the presently preferred form of this invention is illustrated, FIG. 1 discloses a clutch actuating system that includes a clutch pedal 10, a clutch release lever 12 and a Bowden wire 14 that operatively connects the pedal 10 with the release lever 12.

The pedal 10 is pivotally supported at 16 upon vehicle body structure. The lower end of the pedal 10 is provided with a pedal pad 18 for engagement by a vehicle operator. The upper end of the pedal 10 is connected to a flexible cable 20, which forms a portion of the Bowden wire 14, by means of a clevis 22.

The cable 20 is slidably supported by a sheath 24 that has a threaded fitting 26 connected to its upper end. The threaded fitting 26 of the Bowden wire assembly 14 is secured to a bracket member 28 by a pair of jam nuts 30 and 32. The bracket 28 is mounted on vehicle body structure. The jam nuts 30, 32 threadedly engage the end fitting 26 and are disposed on either side of the body supported bracket 28.

The lower end of the sheath 24 has a threaded fitting 35 that is secured to a flange element 34 of the flywheel housing by a pair of jam nuts. This second pair of jam nuts includes a regular nut 36 and a special nut 38. The details of this structure and its function will be described below.

The lower end of the flexible cable 20 extends through an aperture in the outer end of the clutch release lever 12. A ball-shape stop member 40, rigidly affixed to the end of the cable 20 engages the lever 12. A coil spring 42, interposed between the end of the Bowden wire sheath 24 and the clutch release lever 12, urges the lever 12 into engagement with the stop member 40.

The clutch release lever is a lever of the second class with its upper end pivotally supported on a stationary fulcrum member 44 of the clutch assembly. The release lever 12 engages a clutch release bearing 46 which, in turn, is constructed to engage fingers 48 of a clutch pressure plate assembly. The clutch assembly is spring pressed to a normally engaged condition. When the release lever 12 of FIG. 1 is rotated in a clockwise direction, the release bearing 46 causes the release fingers 48 to move in a direction which disengages the clutch.

In accordance with the present invention, means are provided for establishing an appropriate level of free play in the clutch upon initial installation of the clutch actuating system. The measn comprises a special jam nut 38 which has a threaded portion 50 that threadedly engages the threaded fitting 35 on the end of the sheath 24. An annular collar 52 is connected to the threaded portion 50 and forms an axial extension thereon. The collar 52 is of thin wall construction where it joins the threaded portion 50 so as to to be shearable therefrom when subjected to an axial force that exceeds a predetermined minimum.

OPERATION

In the illustrated embodiment, initial clutch free play is automatically established at the time the clutch actuating system is installed in the vehicle.

Installation of the system of FIG. 1 includes connecting the cable 20 of the Bowden wire 14 to the clutch pedal 10. The jam nuts 30 and 32 are then tightened so as to secure the threaded fitting 26 at the upper end of the Bowden wire sheath 24 to the body structure 28. The lower end of the cable wire 20 is then connected to the release lever 12. The regular jam nut 36 is backed off and the special jam nut 38 is tightened until all slack is removed from the system and the clutch release bearing 46 is brought into firm contact with the clutch release fingers 48.

The slack is removed from the actuating system by running the special jam nut 38 finger tight against the flange 34 of the flywheel housing. This action draws the cable 20 to the left and the release lever 12 in a clockwise direction until the bearing 46 contacts the clutch release fingers 48 as seen in FIG. 1.

After all free play is removed, the regular jam nut 36 is tightened with a wrench against the housing flange 34 whereby a force is exerted on the annular extension 52 of the special nut 38. This force causes the extension 52 to fracture. The regular nut 36 is then tightened to close the gap between threaded portion 50 of the nut 38 and the flywheel housing flange 34. The annular collar 52 is displaced to a position overlapping the regular threaded portion 50 and the nut 36 tightened to eliminate the space left by the collar as seen in FIGS. 3 and 4.

FIGS. 3 and 4 illustrate the relative position of the various components after the collar 52 has been fractured and the threaded fitting 35 extended by the tightening of nut 36. The axial length of the collar determines the initial free play in the system and automatically provides a predetermined amount of free play or clearance between the bearing 46 and the clutch release fingers 48 when the pedal 10 is in its clutch engaged position. The initial establishment of free play is accomplished without the use of an external gauge.

The foregoing description presents the presently preferred embodiment of this invention. Modifications and alterations may occur to those skilled in the art that will come within the scope and spirit of the following claims.

I claim:

1. An actuating mechanism having a first movable member, a second movable member and connecting means operatively interconnecting said first and second movable members;
   support means supporting said connecting means;
   a frangible means and a securing means connecting said support means to a support structure;
   said frangible means and said securing means being adjustable to alter the position of said support means and said connecting means;
   said frangible means having a frangible spacer portion engaging said support structure;
   frangible portion being constructed to be fractured to alter the position of said connecting means relative to said support structure by a predetermined dimension.

2. An actuating mechanism having free play establishing means;
   said actuating mechanism including a first movable member, a second movable member and connecting means operatively interconnecting said first and second members;
   supporting means supporting said connecting means;
   said supporting means having a threaded portion;
   a support bracket;
   a first nut and a second nut situated on either side of said support bracket and threadedly engaging said threaded portion of said supporting means;
   said first nut having a threaded portion and a flangible extension;
   said frangible portion engaging said bracket;
   said first nut being constructed to be tightened to remove slack in said actuating mechanism;
   said second nut being constructed to be tightened to exert a force on said first nut of sufficient magnitude to fracture said frangible extension whereby said threaded portion of said first nut and said second nut are engageable with said support bracket;
   said frangible extension being of a length to establish the desired level of free play in said actuating mechanism when said second nut is tightened.

3. A motor vehicle clutch actuating mechanism having a clutch free play establishing means,
   said clutch actuating mechanism including a clutch pedal, a clutch release lever and a flexible cable operatively interconnecting said pedal and said lever;
   supporting means supporting said flexible cable;
   said supporting means having a support portion,
   a support bracket;
   a first fastening means and a second fastening means engaging said support bracket and said support portion of said supporting means;
   said first fastening means having a body portion engaging said support portion and a frangible extension engaging said support bracket;
   said first fastening means being constructed to be adjusted to remove slack in said clutch actuating mechanism;
   said second fastening means being constructed to be adjusted to exert a force on said first fastening means of sufficient magnitude to fracture said frangible extension whereby said body portion of said first fastening means and said second fastening means are engageable with said support bracket;

said frangible extension being of a length to establish the desired level of free play in said clutch actuating mechanism when said second fastening means is full adjusted.

4. A motor vehicle clutch actuating mechanism according to claim 3 and including:

said supporting means comprising a flexible sheath having one of its ends rigidly supported on vehicle structure;

said flexible cable being slidably supported in said sheath.

5. A motor vehicle clutch actuating mechanism having a clutch free play establishing means;

said clutch actuating mechanism including a clutch pedal, a clutch release lever and a Bowden wire assembly operatively interconnecting said pedal and said lever;

a flexible Bowden wire sheath having one of its ends rigidly supported on vehicle structure;

a flexible Bowden cable slidably supported in said sheath and having one end connected to said pedal and its other end connected to said release lever:

the other end of said sheath having a threaded portion;

a support bracket;

a first jam nut and a second jam nut situated on either side of said support bracket and threadedly engaging said threaded portion of said sheath, said first jam nut and a second jam nut situated on either side of said support bracket and threadedly engaging said threaded portion of said sheath, said first jam nut having a threaded body portion engaging said threaded portion of said sheath and a frangible extension engaging said support bracket;

said first jam nut being constructed to be tightened to remove slack in said clutch actuating mechanism;

said second jam nut being constructed to be tightened to exert a force on said first jam nut of sufficient magnitude to fracture said frangible extension whereby said threaded body portion of said first jam nut and said second jam nut are engageable with said support bracket;

said annular extension being of a length to establish the desired level of free play in said clutch actuating mechanism when said second jam nut is tightened.

6. A motor vehicle clutch actuating mechanism according to claim 5 and including:

said frangible extension of said first jam nut comprising an axially extending annular portion.

7. A motor vehicle clutch actuating mechanism according to claim 5 and including:

said first jam jut including said threaded body portion, an annular extension, and a frangible connection between said threaded portion and said extension;

said annular extension being engageable with said support bracket.

8. A motor vehicle clutch actuating mechanism according to claim 5 and including:

said first jam nut including said threaded body portion, an annular extension and a frangible connection between said threaded body portion and said annular extension, said annular extension having a greater interior dimension than the exterior dimension of said threaded body portion whereby said annular extension can fit over said threaded body portion when said frangible connection is fractured.

* * * * *

UNITED STATES PATENT OFFICE
CERTIFICATE OF CORRECTION

Patent No. 3,795,295        Dated March 5, 1974

Inventor(s) Frederick Reno

It is certified that error appears in the above-identified patent and that said Letters Patent are hereby corrected as shown below:

Column 1, line 24, change "ojbect" to -- object --;

line 41, after "as" insert -- a --.

Column 2, line 21, after "housing" insert -- prior to the free play adjustment --.

Signed and sealed this 11th day of March 1975.

(SEAL)
Attest:

RUTH C. MASON
Attesting Officer

C. MARSHALL DANN
Commissioner of Patents
and Trademarks